Jan. 30, 1940.  A. BOENECKE  2,188,620
FASTENER
Filed March 26, 1936
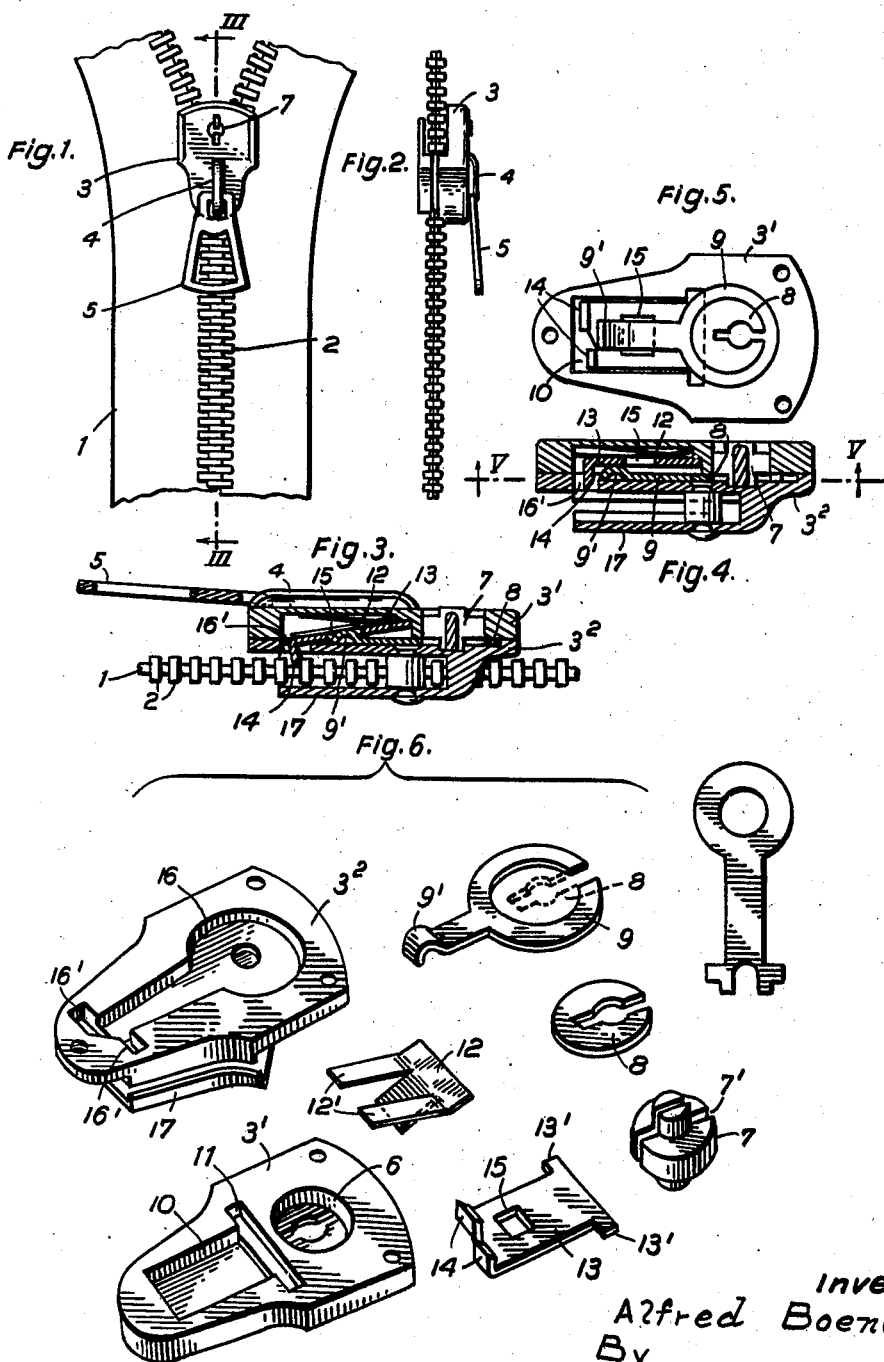
Inventor:
Alfred Boenecke
By
Emil Bönnelycke
Attorney Patented Jan. 30, 1940

2,188,620

UNITED STATES PATENT OFFICE 2,188,620

FASTENER

Alfred Boenecke, Berlin, Germany

Application March 26, 1936, Serial No. 71,026
In Germany August 14, 1935

5 Claims. (Cl. 70—68)

This invention relates to a fastener, such as a so-called "Zipper" fastener, which is capable of being locked.

The invention consists in the fact that the lock is located in the slide member of the fastener, i. e., in that part of the fastener by which the latter is actuated.

The invention will be described more fully with reference to the accompanying drawing, which illustrates a possible form of embodiment of the invention as applied to a "Zipper" fastener.

Fig. 1 is a plan view of the "Zipper" fastener, and

Fig. 2 an elevation thereof.

Fig. 3 is a section of Fig. 1 taken along the line III—III, the slide member of the fastener or "Zipper" fastener slide being engaged.

Fig. 4 is a similar sectional view to Fig. 3, in which the slide member is shown in the open position.

Fig. 5 is a sectional view of Fig. 4 taken along the line V—V.

In Fig. 6 there are shown in perspective views the single parts of the slide member and the parts of the lock with the key.

On the supports 1 there are located the interconnecting members 2 of the fastener, which are secured and separated in the known fashion by means of the slide member 3.

For the actuation of the slide member 3 there is employed the grip 5, which is mounted in movable fashion on the cover plate 3' of the slide member by means of the yoke 4.

According to the invention, the lock for securing the fastener is located in the slide member 3. For this purpose the slide member comprises the two parts 3¹ and 3², in which there are arranged the parts of the lock. On the part 3² there is also provided the back plate 17 for the purpose of actuating the fastener in the known manner (Fig. 3).

To enable the parts of the lock to be mounted in the slide member the parts 3¹ and 3² are furnished with corresponding recesses 6 and 16. The guide member 7 of the lock is fitted into the recess 6 in the part 3¹. In the recess 10 there is situated the flat spring 12, and on the same there is located the locking plate 13. The part 3² of the slide member is furnished with a recess 16 for accommodation of the bolt 9 and the eccentric disc 8. When the parts 7, 12 and 13 are located in the member 3¹ and the lock portions 8 and 9 in the member 3², the members 3¹ and 3² are screwed together, resulting in the arrangement according to Fig. 3 or 4. In Fig. 6 there are shown inside views of the parts 3¹ and 3².

The flat spring 12 is slotted and is so arranged in the recess 10 that its lugs 12' act permanently in resilient fashion on the plate 13, in such a manner that when the two members 3¹ and 3² are screwed together, the two locking claws 14 of the plate 13 project through the openings 16' in the member 3² in each case between two fastener members 2, the fastener then being secured (see Fig. 3).

At the recess 11 in the member 3¹ there is mounted the plate 13, for which purpose the latter is furnished with the abutments 13'. The bolt 9 in the recess 16 acts on the plate 13. For this purpose it possesses at the front the elevation 9' which in the secured position of the fastener rests in the opening 15 in the plate 13 (Fig. 3). In the opening of the bolt 9 there is located in rotatable fashion the eccentric disc 8, as indicated in broken lines in Fig. 6.

For the purpose of locking or opening the fastener the key (Fig. 6) requires to be introduced through the guide member 7, which for this reason is furnished with the slot 7', so that the bits on the key engage with the corresponding slots in the eccentric disc 8.

By turning the key to the extent of 180° the eccentric disc 8 is moved accordingly, rotating in the opening of the bolt 9, so that the latter is imparted a movement towards the front or the rear dependent on the fact as to whether the lock is in the open or closed position.

Assuming the fastener is locked, the elevation 9' on the bolt 9 is situated in the opening 15 in the plate 13 (Fig. 3), and by the turning of the key the bolt 9 is moved forwards in such fashion that the elevation 9' is caused to leave the opening 15 and assume the position in Fig. 4 or Fig. 5. In consequence the elevation 9' overcomes the effect of the spring 12 on the plate 13, so that the claws 14 move out of the range of the fastener members 2 and the fastener is released, so that the slide member 3 may be moved in the opening direction, i. e., downwards in Figs. 1 and 2.

To lock the fastener again the key is again turned in the lock to the extent of 180° in the opposite direction, the elevation 9' of the bolt 9 then returning to the position in Fig. 3. The locking claws 14 are then again situated each between two fastener members 2. Owing to the fact that the claws 14 are bevelled there is obtained the considerable advantage that the slide member, despite a locked condition of the parts, may continue to be moved in the closing direction of the fastener, but cannot be moved in the direction of opening, as will be clearly apparent from Fig. 3. In the locked position the bevelled claws 14 on the plate 13 slide over the fastener members when the slide member continues to be moved in the closing direction, but in the opposite direction they become firmly wedged between the members 2. In this way it is accomplished that the fastener may be locked at any desired point which may be readily accessible—in the case of a lady's bag, for example, locking does not require to be performed at the end of the fastener, which in the majority of cases would not be convenient—whereupon the slide is moved into its extreme position, where it is definitely secured.

The claws 14 and accordingly the openings 16' are staggered in relation to each other corresponding with the position of the members 2.

As regards the bolt 9, it is merely necessary for this to be so shaped that the same upon its movements in the one case overcomes the action of the spring 12 on the plate 13 and in the other case again allows the claws 14 to engage between the fastener members, dependent on the fact as to whether the fastener is secured or released.

The parts of the lock are extremely simple, but nevertheless it is impossible owing to the particular form of the guide member 7 to operate the lock with an ordinary wire.

What I claim as new and desire to secure by Letters Patent is:

1. In a fastener, a portion comprising two parts, and a lock accommodated in recesses in the said parts comprising a bolt having an opening at the one end, an eccentric disc located in the said opening and adapted to be turned by a key, a guide member protecting the said disc, a locking plate, a spring acting on the said plate, and an elevation on the opposite end of the said bolt adapted to act on the said locking plate to overcome the action of the said spring.

2. In a fastener, a portion comprising two parts, and a lock accommodated in recesses in the said parts comprising a bolt having an opening at the one end, an eccentric disc located in the said opening and adapted to be turned by a key, a guide member protecting the said disc, a locking plate, at least one claw on the said plate for securing the fastener, a spring acting on the said plate, and an elevation on the opposite end of the said bolt adapted to act on the said plate to overcome the action of the said spring.

3. A lock for a fastener of the interengaging talon type having a plurality of interconnecting members and a slide member therefor composed of two parts connected together and recessed in their inner surfaces, comprising a locking plate and a bolt in the recesses of the slide member adapted by means of a removable key to lock the slide member by means of the locking plate at any point on the interconnecting members, a guide member for the key, said locking plate being adapted to contact with the interconnecting members when the slide member is in the locked position relative to said interconnecting members, a spring for urging the locking plate between the interconnecting members, and an eccentric disc actuated by the key to slide the bolt upon actuation of the lock.

4. A lock for a fastener of the interengaging talon type having a plurality of interconnecting members and a slide member therefor composed of two parts connected together and recessed in their inner surfaces, comprising a locking plate and a bolt in the recesses of the slide member adapted by means of a removable key to lock the slide member by means of the locking plate at any point on the interconnecting members, a guide member for the key, said locking plate being adapted to contact with the interconnecting members when the slide member is in the locked position relative to said interconnecting members, a spring for urging the locking plate between the interconnecting members, and an eccentric disc actuated by the key to slide the bolt upon actuation of the lock, the locking bolt having two circular arms surrounding the eccentric disc.

5. A lock for a fastener of the interengaging talon type having a plurality of interconnecting members and a slide therefor composed of upper and lower parts connected together and recessed in their inner surfaces, comprising a locking plate and a bolt in the recesses of the slide member adapted by means of a removable key to lock the slide member by means of the locking plate at any point on the interconnecting members, said locking plate having claws as a part of the lock and the lower part of the slide member having a plurality of openings therein through which the claws project to contact the interconnecting members when the slide member is in the locked position relative to said interconnecting members, and the claws having bevelled edges to permit the slide member to slide in one direction to continue to interconnect the interconnecting members but preventing movement of the slide member in the opposite direction.

ALFRED BOENECKE.